United States Patent
Sekine et al.

(10) Patent No.: US 9,734,003 B2
(45) Date of Patent: Aug. 15, 2017

(54) REMOTE MONITORING SUPPORT APPARATUS

(71) Applicant: JAPAN ELEVATOR SERVICE CO., LTD., Tokyo (JP)

(72) Inventors: Shinobu Sekine, Chiyoda-ku (JP); Toru Shibata, Chiyoda-ku (JP); Kazutaka Iwasaki, Chiyoda-ku (JP)

(73) Assignee: JAPAN ELEVATOR SERVICE HOLDINGS CO., LTD., Tokyo (JP)

( * ) Notice: Subject to any disclaimer, the term of this patent is extended or adjusted under 35 U.S.C. 154(b) by 114 days.

(21) Appl. No.: 14/426,001

(22) PCT Filed: Dec. 27, 2012

(86) PCT No.: PCT/JP2012/084006
§ 371 (c)(1),
(2) Date: Mar. 4, 2015

(87) PCT Pub. No.: WO2014/102991
PCT Pub. Date: Jul. 3, 2014

(65) Prior Publication Data
US 2015/0293799 A1    Oct. 15, 2015

(51) Int. Cl.
*G06F 11/07* (2006.01)
*B66B 5/00* (2006.01)
*G05B 23/02* (2006.01)

(52) U.S. Cl.
CPC .......... *G06F 11/079* (2013.01); *B66B 5/0006* (2013.01); *G05B 23/02* (2013.01); *G06F 11/0709* (2013.01)

(58) Field of Classification Search
CPC .. G06F 11/0709; G06F 11/079; B66B 5/0006; B66B 5/0037; B66B 5/0025; B66B 1/2458; B66B 1/3438; B66B 1/3453
See application file for complete search history.

(56) References Cited

U.S. PATENT DOCUMENTS 4,568,909 A * 2/1986 Whynacht ............. B66B 5/0006
  187/393
4,622,538 A * 11/1986 Whynacht ............. B66B 5/0006
  340/500

(Continued)

FOREIGN PATENT DOCUMENTS

CN    1043025 A    6/1990
CN    1495122 A    5/2004

(Continued)

OTHER PUBLICATIONS

Office Action dated Feb. 15, 2016, issued in counterpart Chinese Application No. 201280076535.6, with English translation. (14 pages).

(Continued)

*Primary Examiner* — Nadeem Iqbal
(74) *Attorney, Agent, or Firm* — Westerman, Hattori, Daniels & Adrian, LLP

(57) ABSTRACT

A remote monitoring support apparatus is connected to a control board; performs communication between a management server computer and the control board that controls operation of an elevator; receives a fault detection instruction that instructs transmission of information related to a state of the elevator and that is transmitted from the management server computer; outputs to the control board, an execution instruction for a fault detection operation according to the received fault detection instruction; obtains at least one among a signal output from the control board to an external destination in response to the output execution instruction for the fault detection operation, and a signal that is for alarm activation and output from the control board to notify the external destination of an abnormality that occurred at the elevator; generates notification information that is based on the obtained signal; and transmits the (Continued)

generated notification information to the management server computer.

8 Claims, 4 Drawing Sheets

(56) References Cited

U.S. PATENT DOCUMENTS

| | | | | |
|---|---|---|---|---|
| 5,551,532 | A * | 9/1996 | Kupersmith | B66B 1/2458 |
| | | | | 187/247 |
| 6,998,995 | B2 * | 2/2006 | Nakajima | B66B 5/0006 |
| | | | | 340/3.1 |
| 8,893,858 | B2 * | 11/2014 | Shi | 187/247 |
| 9,423,369 | B2 * | 8/2016 | Fargo | B66B 7/1223 |
| 2004/0094366 | A1 | 5/2004 | Weinberger et al. | |
| 2004/0240627 | A1 * | 12/2004 | Nakajima | B66B 5/0006 |
| | | | | 379/37 |
| 2011/0315490 | A1 * | 12/2011 | Shi | B66B 5/0025 |
| | | | | 187/393 |
| 2014/0262629 | A1 * | 9/2014 | Toutaoui | B66B 1/3461 |
| | | | | 187/393 |

FOREIGN PATENT DOCUMENTS

| | | | |
|---|---|---|---|
| CN | 1495124 | A | 5/2004 |
| CN | 1572700 | A | 2/2005 |
| GB | 2226428 | A | 6/1990 |
| JP | 6-48665 | A | 2/1994 |
| JP | 11-100183 | A | 4/1999 |
| JP | 2001-101557 | A | 4/2001 |
| JP | 2001-320495 | A | 11/2001 |
| JP | 2002-3114 | A | 1/2002 |
| JP | 2003-2550 | A | 1/2003 |
| JP | 2004-277174 | A | 10/2004 |
| JP | 2006-143473 | A | 6/2006 |
| JP | 2007-91396 | A | 4/2007 |
| JP | 2011-88711 | A | 5/2011 |
| JP | 2011-102180 | A | 5/2011 |
| JP | 2012-30903 | A | 2/2012 |
| JP | 5389229 | B1 | 1/2014 |

OTHER PUBLICATIONS

International Preliminary Search Report dated Jun. 30, 2015 issued in counterpart International application No. PCT/JP2012/084006, with English translation. (13 pages).
International Search Report dated Apr. 2, 2013 issued in correponding application No. PCT/JP2012/084006.
Japan Office Action dated May 29, 2014 issued in corresponding application No. JP2014504890; partial translation.
Office Action dated Nov. 8, 2016, issued in counterpart Japanese Application No. 2014-164606, with partial English translation. (4 pages).
Office Action dated Nov. 8, 2016, issued in counterpart Japanese Application No. 2014-164604, with partial English translation. (4 pages).
Office Action dated Mar. 28, 2017, issued in counterpart Japanese Patent Application No. 2014-164606, with English translation. (4 pages).

* cited by examiner

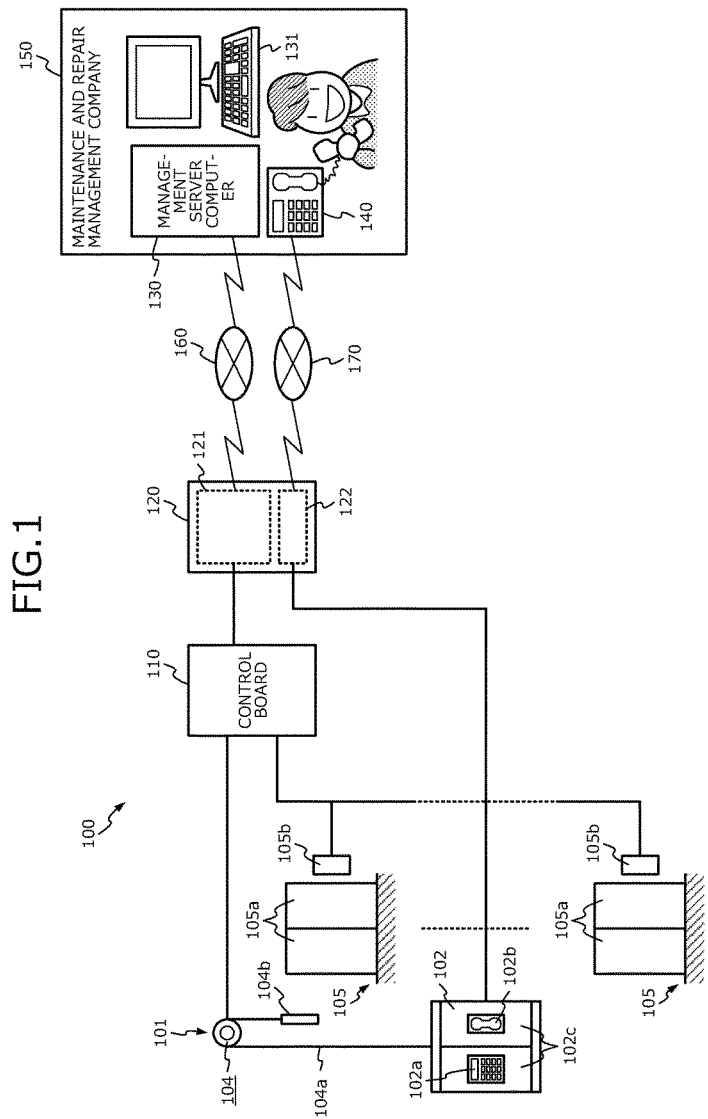

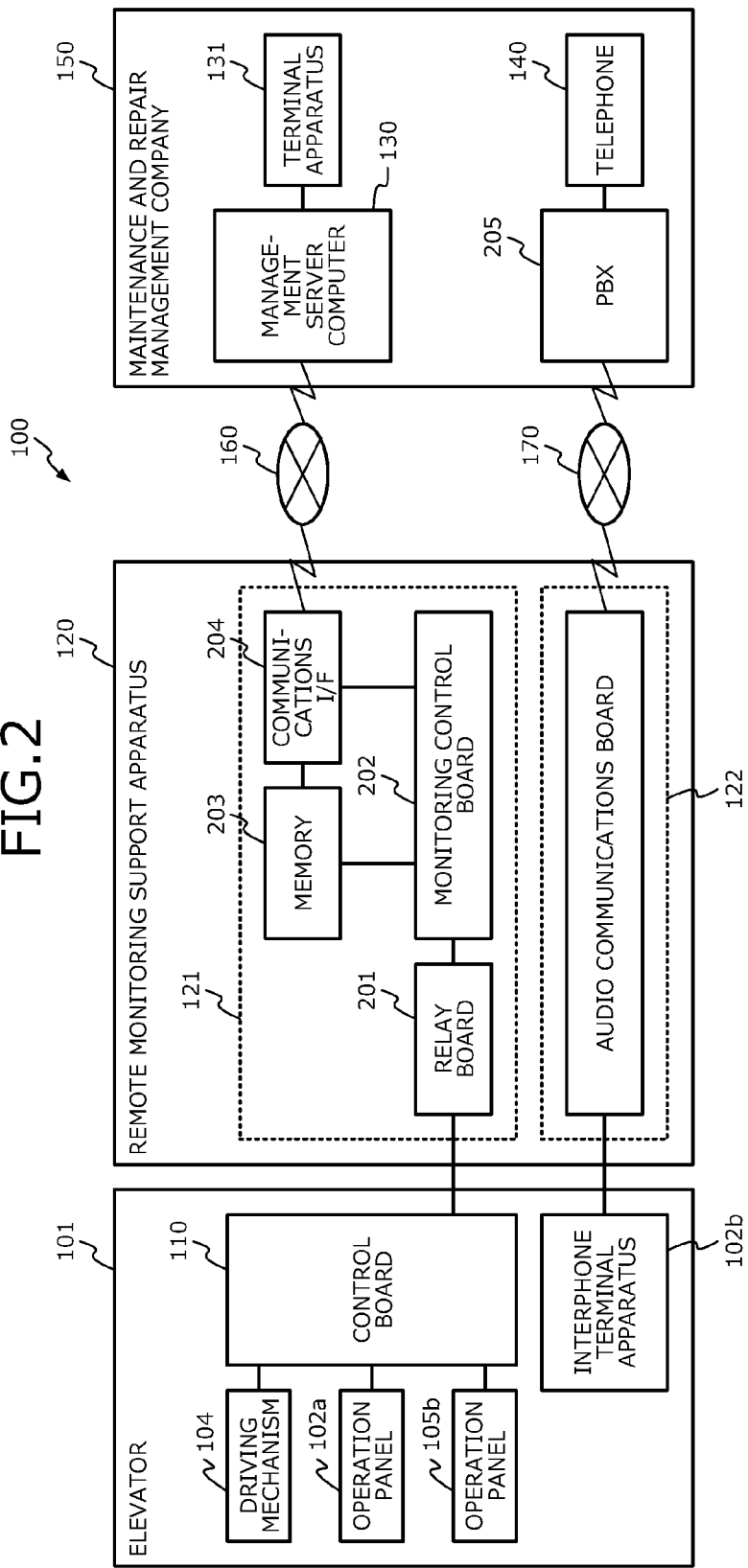

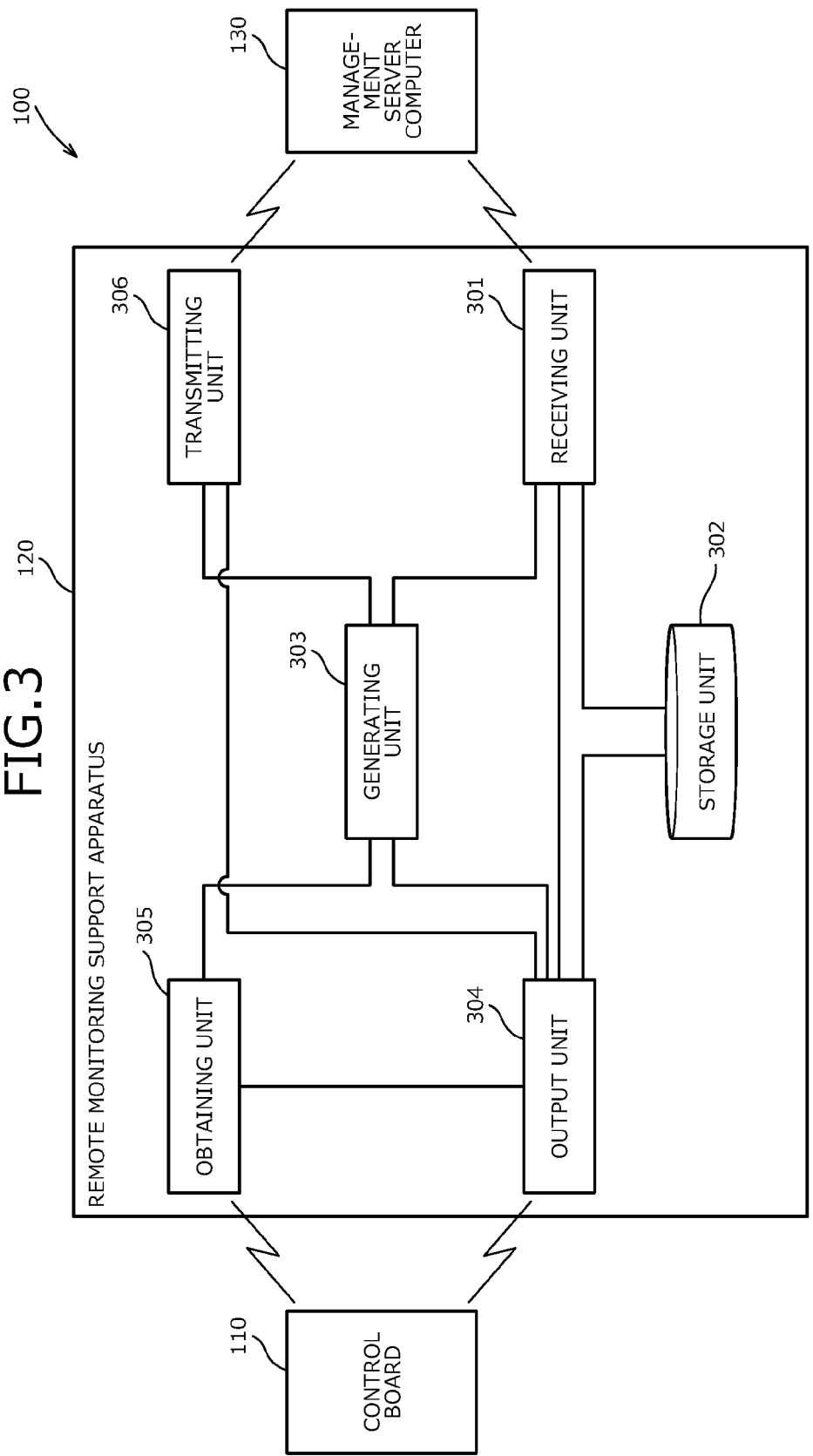

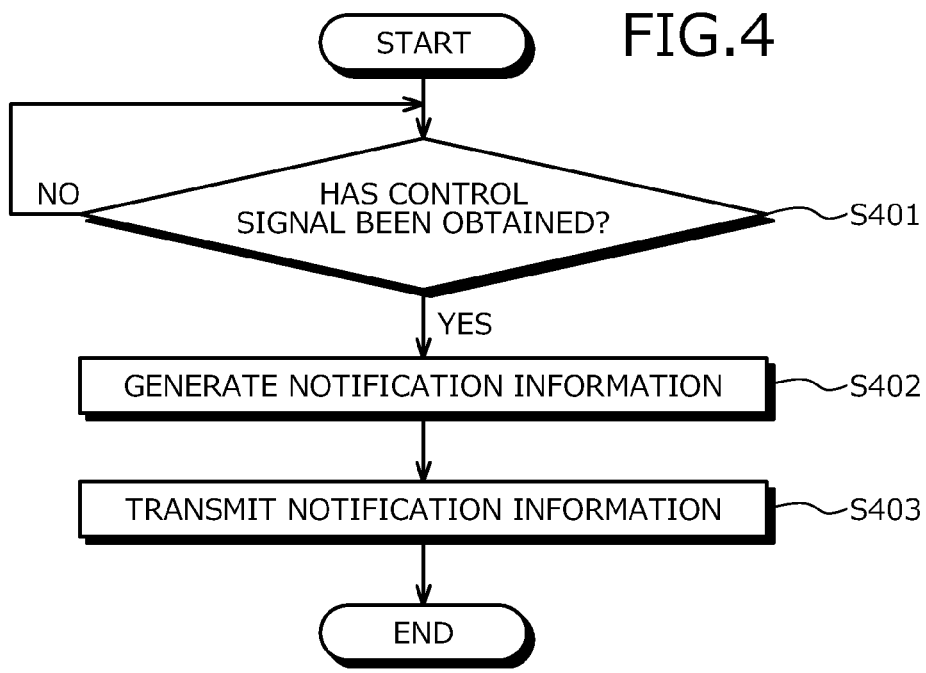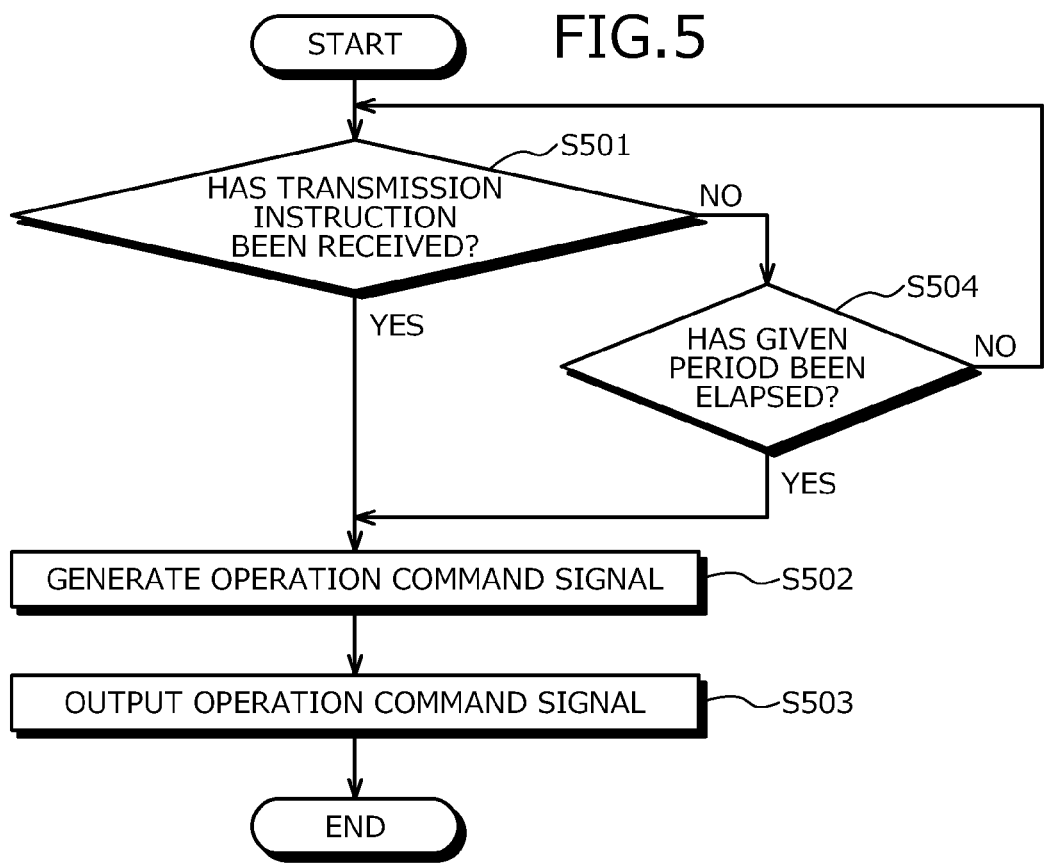

REMOTE MONITORING SUPPORT APPARATUS

TECHNICAL FIELD

The present invention related to a remote monitoring support apparatus that performs remote elevator-monitoring.

BACKGROUND ART

Conventionally, with respect to an elevator installed in a multistory building, a worker performs periodically or when a failure occurs with the elevator, fault detection involving inspection work (fault detection/maintenance and repair work) for maintenance and repair to ensure proper operation of the elevator.

Further, a communications function is provided on a control board (control apparatus) that controls the running operation of the elevator and communication is performed between the control board and a management server computer installed in a remote location from the elevator, whereby a conventional remote elevator-monitoring system monitors the elevator from the remote location. Consequently, without the dispatch of a worker to the site where the elevator is installed, the state of the elevator can be monitored from a remote location.

More specifically, with a related technology, by switching from a normal mode to a maintenance and repair mode, the activation of an alarm from the building to a monitoring center is prevented and during the maintenance and repair mode, data concerning the maintenance and repair work carried out by the worker is stored to a maintenance and repair work data storage unit. When the normal mode is switched to, the maintenance and repair work data stored in the maintenance and repair work data storage unit is taken in and based on the maintenance and repair work data, whether the maintenance and repair work is proper is determined (for example, refer to Patent Document 1 below).

Patent Document 1: Japanese Laid-Open Patent Publication No. 2011-102180

DISCLOSURE OF INVENTION

Problem to be Solved by the Invention

Nonetheless, with the conventional technology above, for example, when the elevator is an older model and at the time of installation, remote monitoring was not assumed, the control board of the elevator is not equipped with a communications function and therefore, a problem arises in that remote monitoring is difficult to perform after installation of the elevator.

Thus, with the conventional technology above, a troublesome problem arises in that each time the periodically performed fault detection/maintenance and repair work is performed at the site where the elevator is installed, a worker has to go to the site. Further, with the conventional technology above, a troublesome problem arises in that when an abnormality occurs at the elevator, the manager of the building in which the elevator is installed has to contact a worker and each time contact is received, the worker has to go to the site.

Further, with the conventional technology above, if failure occurs at an elevator that does not support remote monitoring, a problem arises in that discovery of the failure is delayed and measures to resolve the failure are also delayed.

Further, using the conventional technology above to remotely monitor an existing elevator, the control board of the control apparatus of the existing elevator has to be replaced with another control board to which a communications function has been added. In other words, in a case where the conventional technology above is used to remotely monitor an existing elevator, a troublesome problem arises in that since the control board has to be replaced, the work becomes extensive. Further, in this case, during the replacement work for the control board, the elevator cannot be used, which may particularly hinder the activity of users of high-rise buildings.

To solve the problems of the conventional technology above, one object of the present invention is to provide a remote monitoring support apparatus capable of performing remote elevator-monitoring irrespective of whether the elevator itself has a communications function.

Further, to solve the problems of the conventional technology above, one object of the present invention is to provide a remote monitoring support apparatus capable of improving the reliability of the elevator by performing remote elevator-monitoring irrespective of whether the elevator itself has a communications function.

Means for Solving Problem

To solve the problems above and achieve an object, a remote monitoring support apparatus according to the present invention respectively with a management server computer and a control board that controls operation of an elevator. The remote monitoring support apparatus includes an obtaining unit that obtains a signal output from the control board to a destination external to the control board; a generating unit that generates based on the obtained signal, notification information that includes information related to a state of the elevator; and a transmitting unit that transmits the generated notification information to the management server computer.

In the remote monitoring support apparatus according to the invention above, the obtaining unit obtains a control signal that is output from the control board to components of the elevator and that controls the components.

In the remote monitoring support apparatus according to the invention above, the obtaining unit obtains an alarm signal that is output from the control board to the destination external to the control board, the alarm signal being output to notify the destination of an abnormality that has occurred at the elevator.

The remote monitoring support apparatus according to the invention further includes a receiving unit that receives a transmission instruction for the notification information, the transmission instruction being transmitted by the management server computer; and an output unit that when the receiving unit receives the transmission instruction, outputs to the control board, an operation command signal that causes execution of a fault detection operation that performs fault detection with respect to an operating state of the elevator. The obtaining unit obtains a control signal that is output from the control board to components of the elevator in response to the operation command signal output by the output unit.

In the remote monitoring support apparatus according to the invention above, the output unit outputs the operation command signal to the control board, through a terminal that can connect a portable terminal apparatus that outputs the operation command signal to the control board.

In remote monitoring support apparatus according to the invention above, the output unit, when a given period has elapsed since outputting the fault detection operation causing execution of the fault detection operation, outputs a second operation command signal that causes a subsequent execution of the fault detection operation.

Effect of the Invention

A remote monitoring support apparatus according to the present invention can obtain information related to the state of an elevator via a management server computer at a remote location from the elevator and thereby, achieves an effect of enabling remote elevator-monitoring to be performed irrespective of whether the elevator itself has a communications function.

BRIEF DESCRIPTION OF DRAWINGS

FIG. 1 is a diagram depicting a system configuration of a remote monitoring system of an embodiment according to the present invention;

FIG. 2 is a diagram depicting a hardware configuration of the remote monitoring support apparatus configuring the remote monitoring system of the embodiment according to the present invention;

FIG. 3 is a block diagram depicting a functional configuration of the remote monitoring support apparatus configuring the remote monitoring system of the embodiment according to the present invention;

FIG. 4 is a flowchart (part 1) depicting a process procedure of the remote monitoring support apparatus of the embodiment according to the present invention; and FIG. 5 is a flowchart (part 2) depicting the process procedure of the remote monitoring support apparatus of the embodiment according to the present invention.

BEST MODE(S) FOR CARRYING OUT THE INVENTION

Preferred embodiments of a remote monitoring support apparatus according to the present invention will be described in detail with reference to the accompanying drawings.

(System Configuration of Remote Monitoring System)

A system configuration of a remote elevator-monitoring system equipped with a remote monitoring support apparatus of an embodiment according to the present invention will be described. FIG. 1 is a diagram depicting a system configuration of a remote monitoring system of the embodiment according to the present invention.

In FIG. 1, a remote monitoring system 100 of the embodiment according to the present invention, for example, can be configured by a control board (control apparatus) 110, a remote monitoring support apparatus 120, a management server computer 130, and a telephone 140. The remote monitoring system 100 monitors the operation of an elevator 101 by using the management server computer 130 installed at a remote location from the elevator 101. The management server computer 130 monitors the operation of the elevator 101 via the remote monitoring support apparatus 120.

The management server computer 130 is installed at a remote location that is different from and distant from the location where the elevator 101 that is subject to monitoring is installed. More specifically, the management server computer 130, for example, is installed at a maintenance and repair management company 150 that is responsible for the maintenance and repair management of the elevator 101.

The telephone 140, for example, is installed at the maintenance and repair management company 150 that installed the management server computer 130. Installation of the management server computer 130 and the telephone 140 at the maintenance and repair management company 150 enables direct telephone communication between an individual in a cab 102 of the elevator 101 and an operator of the maintenance and repair management company 150.

The elevator 101 is installed in a multistory building and is equipped with the cab (riding cab) 102 in which passengers and/or goods are carried. One cab 102 is disposed in one elevator 101. The cab 102 is installed in a hoistway (not depicted) that passes through the floors in a building, along a vertical direction. The elevator 101 can be realized, for example, by a cable-borne (traction) elevator.

The elevator 101 that can be monitored by the remote monitoring system 100 of the embodiment according to the present invention is not limited to a cable-borne elevator. In the remote monitoring system of the embodiment according to the present invention, instead of the elevator 101 of a cable-borne design or in addition to a cable-borne elevator, for example, a hydraulic elevator may be monitored as the elevator 101.

The cab 102 is equipped with an operation panel 102a that has operation buttons including floor buttons and door opening and closing buttons, and an indicator that indicates the floor at which the cab 102 is located. The operation panel 102a equipped in the cab 102 has a control board for the operation panel 102a and through the control board for the operation panel 102a, is connected to a control board 110. Further, the cab 102 is equipped with an interphone terminal apparatus 102b. The interphone terminal apparatus 102b has a call button, a microphone, and a speaker (not depicted). The interphone terminal apparatus 102b is connected to the remote monitoring support apparatus 120.

In the hoistway, a driving mechanism 104 related to lifting and lowering the cab 102 is provided. The driving mechanism 104, for example, can be provided in an upper portion in the hoistway. The driving mechanism 104 is configured by a winch, a sheave, a cable 104a, a counterweight 104b, etc. The driving mechanism 104 further has an electromagnetic brake, a governor, etc. (not depicted). The driving mechanism 104 can be realized easily by known technologies and therefore, description thereof will be omitted. The driving mechanism 104 is not limited to installation at an upper portion of the hoistway. The driving mechanism 104, for example, may be installed in a lower portion (pit) of the hoistway in a case where the elevator 101 is hydraulic.

The cab 102 is attached to one end of the cable 104a and the counterweight 104b is attached to the other end of the cable 104a. In the cable-borne elevator 101, with the cable 104a, which is respectively connected at each end to the cab 102 and the counterweight 104b, looped around the sheave and the winch in a counterbalancing scheme, the winch is driven, whereby the frictional force (traction) between the cable 104a and the sheave is used to lift and lower the cab 102. In the hoistway, a guide rail (not depicted) is provided that guides vertical positioning of the cab 102.

Doors 105a and 102c are provided at positions (landings) 105 corresponding to each floor in the hoistway and on the cab 102, respectively. In the cab 102, a motor (not depicted) is provided that opens and closes the doors 102c provided on the cab 102 and the doors 105a provided at the landings 105.

The motor that opens and closes the doors 105a, 102c is connected to the control board 110.

The doors 105a provided at the landings 105 are locked by a device known as an interlock. In a state where the elevator 101 has reached a requested floor and the motor is driven, a driving mechanism portion of the doors 102c provided on the cab 102 and the interlock engage, whereby the locked state imposed by the interlock is released and, the doors 102c provided on the cab 102 and the doors 105a provided at the landings 105 open and close in tandem.

The elevator 101 is equipped with a door opening/closing sensor (not depicted) that detects the opening/closing of the doors 102c, 105a. The door opening/closing sensor varies output according to whether the doors 102c, 105a are in an opened state or a closed state. The door opening/closing sensor, for example, can be realized by a microswitch, a photoelectric sensor, etc. The door opening/closing sensor is connected to the control board 110 by wiring through which signals output from the door opening/closing sensor are input to the control board 110.

At each of the landings 105, an operation panel 105b is respectively provided that has a call button (not depicted) and an indicator that indicates the floor at which the cab 102 is located. The operation panel 105b provided at each of the landings 105 has a control board for the operation panel 105b and through this control board for the operation panel 105b, is connected to the control board 110.

The remote monitoring support apparatus 120, for example, can be placed in a housing that houses the control board 110 of the elevator 101 or attached to a wall of the hoistway. The remote monitoring support apparatus 120 has a main control board 121 and an audio communications board 122. The main control board 121 is connected to the control board 110. Further, the main control board 121 is connected to the management server computer 130 through a network 160 such as the Internet. By connecting the main control board 121 and the management server computer 130 through the Internet rather than through a public audio network 170 such as telephone lines, delays in assessing the state of the elevator caused by a flooding of the telephone lines during an emergency are prevented, enabling an expeditious response.

The audio communications board 122 is connected to the interphone terminal apparatus 102b and the public audio network 170. The audio communications board 122, for example, can be realized by a Personal Handy-phone System (PHS) board. The public audio network 170 includes fixed-line telephone networks (public switched telephone networks) and mobile telephone networks. The public audio network 170 is configured by non-depicted switches such as subscriber line switches that accommodate telephone lines, toll switches that bundle the subscriber line switches, and gateway switches that connect to the telephone networks of other providers, etc. The public audio network 170 is a known technology and therefore, description thereof will be omitted.

The main control board 121 may perform communication using the PHS board of the audio communications board 122. In this case, the remote monitoring support apparatus 120 uses the PHS board for audio communication as well as for data communication. The installation site of the elevator 101 is fixed and therefore, by performing communication that uses PHS, the quality of the communication can be assured and costs related to the communication can be suppressed.

The management server computer 130, for example, can be realized by a computer apparatus such as a personal computer. An operations terminal apparatus 131 may be connected to the management server computer 130. The management server computer 130 and the operations terminal apparatus 131 may be provided at the same location or may be provided different locations. The operations terminal apparatus 131 may be a single unit or multiple units. The operations terminal apparatus 131, for example, can be realized by a computer apparatus such as a personal computer that has input devices such as a keyboard and a mouse, a display, etc. Further, a printer (not depicted) for outputting reports concerning the state of the elevator 101 may be connected to the operations terminal apparatus 131.

At the maintenance and repair management company 150, in addition to the management server computer 130 and the telephone 140, a private branch exchange (PBX) (refer to reference numeral 205 in FIG. 2) can be setup. The telephone 140 is connected to the public audio network 170 through the PBX. In the remote monitoring system 100, the telephone 140 may be connected directly to the public audio network 170 without setting up a PBX.

(Hardware Configuration of Remote Monitoring System 100)

A hardware configuration of the remote monitoring support apparatus 120 configuring the remote monitoring system 100 of the embodiment according to the present invention will be described. FIG. 2 is a diagram depicting a hardware configuration of the remote monitoring support apparatus 120 configuring the remote monitoring system 100 of the embodiment according to the present invention.

In FIG. 2, the control board 110 controls the running operation of the elevator 101, by controlling the driving of each component configuring the elevator 101. The control board 110 outputs control signals to the components configuring the elevator 101 and based on signals output from the components, controls the running operation of the elevator 101.

Upon receiving each input operation of an operation button by a user of the elevator 101, the control board for the operation panel 102a described above generates a call signal according to the input operation and outputs the generated call signal to the control board 110. The control board 110, for example, based on the call signal output from the control board for the operation panel 102a, outputs a control signal that controls the driving of the driving mechanism 104 and thereby, controls the running operation of the elevator 101.

More specifically, the control board 110, for example, based on the call signal output from the control board for the operation panel 102a, generates a control signal for the motor that lifts and lowers the cab 102 and outputs the generated signal to the motor that lifts and lowers the cab 102. Thus, the motor that lifts and lowers the cab 102 is driven to rotate in a direction that lifts or lowers the cab 102. The motor that lifts and lowers the cab 102, for example, is controlled by using an inverter and when the cab 102 is to be stopped at a floor, is controlled by the control board 110 so that rotation of the motor is suspended.

For each output of a control signal to the motor that lifts and lowers the cab 102, the control board 110 obtains the rotation frequency of the motor operated according to the control signal. The rotation frequencies of the motor, for example, can be obtained by using an encoder. Thus, the control board 110 can determine whether the motor that lifts and lowers the cab 102 operated properly according to the control signal output to the motor.

More specifically, for example, based on a call signal output from the control board for the operation panel 102a, the control board 110 generates a control signal to operate a brake to stop the cab 102 at a given floor and outputs the generated control signal to the brake. According to the control signal output from the control board 110, the brake stops the vertical movement of the cab 102 so that the cab 102 stops at the given floor. Thus, the cab 102 can be stopped at a given floor.

For each output of a control signal to the brake, the control board 110 obtains an output signal from a brake sensor that varies output according to the operation of the brake. The brake sensor, for example, can be realized by a microswitch or a photoelectric sensor. Thus, the control board 110 can determine whether the brake operated properly according to the control signal output to the brake.

More specifically, for example, based on a call signal output from the control board for the operation panel 102a, the control board 110 generates a control signal to open/close the doors 102c, 105a at the floor where the cab 102 was stopped by the brake and outputs the generated control signal to the motor that opens and closes the doors 102c of the cab 102 and the doors 105a of the landing 105. Thus, at the floor where the cab 102 is stopped, the doors 102c, 105a can be opened/closed. As described, the motor that opens/closes the doors 105a is locked by a device such as an interlock and therefore, if the doors 105a are not completely closed, the motor does not operate.

For each output of a control signal to the motor that opens and closes the doors 102c, 105a, the control board 110 obtains an output signal from the door opening/closing sensor. Thus, the control board 110 can determine whether the doors 102c, 105a operated properly according to the control signal output to the motor that opens and closes the doors 102c, 105a.

Further, the control board 110, for example, outputs to the control board for the operation panel 102a, a control signal that includes a floor signal that indicates the floor at which the cab 102 is located. The floor at which the cab 102 is located, for example, can be identified based on an output signal from a sensor (not depicted) installed at each floor in the hoistway. Upon receiving the control signal that includes the floor signal, the control board for the operation panel 102a controls the indicator based on the received control signal to indicate the floor at which the cab 102 is located, the traveling direction of the cab 102 (up or down), etc.

Each time the location of the cab 102 changes, for example, the control board 110 outputs to the control board for the operation panel 102a and the control board for the operation panel 105b, a control signal that includes a floor signal. Alternatively, for example, irrespective the location of the cab 102, the control board 110 may periodically output to the control board for the operation panel 102a and the control board for the operation panel 105b, a control signal that includes a floor signal.

Similar to the control board for the operation panel 102a, upon receiving each input operation of a call button by a user of the elevator 101, the control board for the operation panel 105b generates a call signal according the input operation and outputs the generated call signal to the control board 110. If a call signal has been output from the control board for the operation panel 105b, similar to a case when a signal has been output from the control board for the operation panel 102a, the control board 110 generates based on the signal output from the control board for the operation panel 105b, various types of control signals and outputs the generated control signals to the respective components and thereby, controls the running operation of the elevator 101.

Each time the cab 102 is lifted or lowered in response to a signal output from the operation panel 102a or the operation panel 105b, the control board 110 outputs an activation signal indicating that components have been activated to lift/lower the cab 102. For example, for movement from the first floor to the second floor, the control board 110 outputs an activation signal once. Further, in the case of movement from the first floor to the fifth floor without any stops between, for example, the control board 110 outputs an activation signal once. In the case of movement from the first floor to the fifth floor after stopping along the way at the third floor (the doors are opened and closed), for example, the control board 110 outputs an activation signal twice.

The control board 110 may calculate the travel distance and/or travel time of the cab 102, each time the cab 102 is lifted/lowered. The travel distance of the cab 102, for example, can be calculated based on an activation count. Further, the travel time of the cab 102, for example, can be calculated based on the floor signal. More specifically, for example, when the cab 102 is at the first floor and a call operation is received from the operation panel 105b of the landing 105 on the fourth floor, the cab 102 moves 3 floors, from the first floor to the fourth floor.

The control board 110 is equipped with non-depicted memory and each time an activation signal is output, the control board 110 stores to the memory, the number of times that the activation signal is output, i.e., the activation count. Instead of the activation count or in addition to the activation count, the control board 110 may store to the memory, a running operation history of each component driven when the cab 102 is lifted/lowered, the doors 105a, 102c are opened/closed, etc. More specifically, the control board 110, for example, may store to the memory as the running operation history, the activation count, the travel distance of the cab 102, the travel time of the cab 102, information related to operations counts of various relays operated for the lifting/lowering of the cab 102, the opening/closing of the doors 105a, 102c, etc.

Further, the control board 110 determines whether the doors 102c, 105a are in an open state or a closed state, based on the output value of the door opening/closing sensor. The control board 110 can determine based on the control signal output thereby to open/close the doors 102c, 105a and the output value of the door opening/closing sensor, whether the doors 102c, 105a actually opened/closed in response to the output of the control signal to open/close the doors 102c, 105a.

When the operation mode of the elevator 101 changes, the control board 110 outputs a signal indicating that the operation mode has changed. More specifically, for example, if the operation mode of the elevator 101 is changed from a normal operation mode to an operation mode other than the normal operation mode, the control board 110 outputs to an external destination, a signal giving notification of the operation mode change or a signal giving notification of the operation mode resulting from the change (notification that the operation mode is other than the normal operation mode). More specifically, for example, if the operation mode of the elevator 101 changes from an operation mode other than the normal operation mode to the normal operation mode, the control board 110 outputs to an external destination, a signal (alarm signal) giving notification of the operation mode change or a signal giving notification of the operation mode resulting from the change (notification that the operation mode is the normal operation mode).

Further, if a failure is detected at the elevator 101, the control board 110 outputs (triggers) a signal (alarm signal) giving notification of the occurrence of the failure. More specifically, for example, if the control board 110 detects based on the output value of the door opening/closing sensor, that the doors 105a, 102c are not operated despite an output of the control signal to open/close the doors 105a, 102c, the control board 110 outputs (triggers) a signal (alarm signal) giving notification of the occurrence of a failure at the elevator 101, involving the doors 105a, 102c.

When a call button is operated, the interphone terminal apparatus 102b outputs to the remote monitoring support apparatus 120, a call signal indicating that call button was operated. If the call signal output from the interphone terminal apparatus 102b is input to the audio communications board 122, the remote monitoring support apparatus 120 sends a call signal to the telephone 140, through the public audio network 170 or the PBX 205. Thus, audio communication (telephone call) between the interphone terminal apparatus 102b and the telephone 140 can be performed.

While connection between the remote monitoring support apparatus 120 (the audio communications board 122) and the telephone 140 provided at the maintenance and repair management company 150 is established, the interphone terminal apparatus 102b outputs to the remote monitoring support apparatus 120, an audio signal input by the microphone. Further, while connection between the remote monitoring support apparatus 120 (the audio communications board 122) and the telephone 140 is established, the interphone terminal apparatus 102b outputs through the speaker, an audio signal output from the remote monitoring support apparatus 120.

The remote monitoring support apparatus 120 obtains the signals (control signals) output from the control board 110 to the components of the elevator 101 and based on the obtained control signals, generates notification information and transmits the generated notification information to the management server computer 130. The notification information includes information related to the state of the elevator 101, identification information of the elevator 101 that transmitted the notification information, etc.

Information related to the state of the elevator 101, for example, indicates the traveling direction of the cab 102, the destination floor of the cab 102, whether the cab 102 is stopped at the destination floor, whether the motor that opens/closes the doors 105a, 102c is operated, etc. Further, information related to the state of the elevator 101, for example, indicates the floor at which the cab 102 is currently located, whether various safety apparatuses are in operation, etc.

The identification information of the elevator 101, for example, may be the manufacturing serial number of the elevator 101, a number set based on the installation location of the elevator 101 (address, etc.), a number arbitrarily set by a worker performing the maintenance and repair inspection of the elevator 101, etc. The identification information of the elevator 101 can be a combination of numeric and alphabetic characters of a given number of digits.

The main control board 121 of the remote monitoring support apparatus 120, for example, can be configured by a relay board 201, a monitoring control board 202, memory 203, and a communications I/F (interface) 204. The remote monitoring support apparatus 120 obtains through the relay board 201 of the main control board 121, a control signal output from the control board 110. The remote monitoring support apparatus 120, for example, is connected to a relay provided in the control board 110 and to the relay board 201, and at the main control board 121, can obtain through the relay board 201 and from the relay, the control signal output from the control board 110.

The relay is provided for each component to be controlled by the control board 110 and according to the state of the components of the elevator 101, the output changes (e.g., is turned ON/OFF). For example, an electromagnetic relay that physically opens and closes a connection by an electromagnet can be used as the relay. The connection of the electromagnetic relay, for example, may be to make contact (the connection is closed when current flows) or break contact (the connection is open when current flows). Further, the connection of the electromagnetic relay, for example, may be a transfer contact (switches connections by a flow of current), or a ratchet connection (opens/closes the connection with each flow of current). Further, a solid state relay, a programmable relay, etc. may be used as the relay, for example.

The remote monitoring support apparatus 120, for example, has a connection of the control board 110 and the relay board 201 in the feet (wiring connecting the control board 110 and the relay) supporting the relay with respect to the control board 110, and can be connected to the control board 110 through the connection. The connection may be provided in the feet (wiring connecting the control board 110 and the relay) for signal input to the relay from the control board 110, or may be provided in the feet (wiring connecting the control board 110 and the relay) for signal output to the control board 110 from the relay.

Further, the remote monitoring support apparatus 120, for example, has a connection of the control board 110 and the relay board 201 in the feet (wiring connecting the control board 110 and the IC chip) of the IC chip provided on the control board 110 for the components of the elevator 101, and can be connected to the control board 110 through the connection. In this case, the connection may be provided in the feet (wiring connecting the control board 110 and the IC chip) for signals input to the IC chip from the control board 110, or may be provided in the feet (wiring connecting the control board 110 and the IC chip) for signals output to the control board 110 from the IC chip.

In the control board 110, LEDs may be provided that turn off and on interlocked with the operation of the components of the elevator 101 such that a worker can visually confirm the operation state of the components of the elevator 101. In this case, the remote monitoring support apparatus 120, for example, may include photoelectric sensors (not depicted) whose output changes according the turning off/on of the LEDs. The remote monitoring support apparatus 120 is connected to the photoelectric sensors and the relay board 201, and through the relay board 201, obtains at the main control board 121, the output values of the photoelectric sensors, whereby control signals output from the control board 110 are obtained.

In the relay board 201 of the remote monitoring support apparatus 120, for example, wiring connecting the control board 110 and the components that are output destinations of control signals can be connected to a connection (terminal) connected to the control board 110. As a result, the remote monitoring support apparatus 120, from a connection (terminal) with the wiring of the control board 110, can obtain control signals through the relay board 201. The connection (terminal) in this case, is not limited to being provided on the control board 110 and may be a connection with the relay board 201 in the remote monitoring support apparatus 120, provided in the wiring connecting the control board 110 and the components that are output destinations of the control signals.

Alternatively, the relay board 201 of the remote monitoring support apparatus 120 can be connected to wiring (a branch) that branches the wiring connecting the control board 110 and the components that are output destinations of control signals that are from the control board 110. As a result, the remote monitoring support apparatus 120 can obtain the control signals from the branch and through the relay board 201. At the branch position of the branch and the wiring that connects the components of the elevator 101 and the control board 110, a branch connector may be provided that branches into two directions, control signals output from the control board 110. As a result, the remote monitoring support apparatus 120 can be connected easily to the control board 110 through the branch connector.

The relay board 201 analyzes signals that have been input and outputs analysis results to the monitoring control board 202. Based on the analysis results output from the relay board 201, the monitoring control board 202 generates notification information and transmits the generated notification information to the management server computer 130 through the communications I/F 204. Further, the monitoring control board 202 stores to the memory 203, the analysis results output from the relay board 201. The monitoring control board 202 may directly store to the memory 203, the signals input to the relay board 201.

The memory 203 can be realized by non-volatile memory that retains stored information even when the power supply is cut. More specifically, for example, the memory 203 can be realized by flash memory, Electrically Erasable Programmable Read-Only Memory (EEPROM), Erasable Programmable Read Only Memory (EPROM), etc.

Various types of signals output from the control board 110 differ according to the model, etc. of the elevator 101. At the time of analysis, the relay board 201 converts the various types of signals output from the control board 110 into a format that can be processed by the monitoring control board 202. The remote monitoring support apparatus 120 can perform remote monitoring of the elevator 101, irrespective of the model of the elevator 101, by analyzing input signals at the relay board 201 and converting the signals into a format that can be processed by the monitoring control board 202.

Further, the remote monitoring support apparatus 120 outputs various types of operation command signals to the control board 110, through the relay board 201 controlled by the monitoring control board 202 in the main control board 121. The remote monitoring support apparatus 120 outputs operation command signals through the control board 110, when the driving of the components of the elevator 101 are controlled. An operation command signal, for example, can be realized by the same signal as a signal output from the operation panel 102a or the operation panel 105b when an input operation instructing movement to a given floor is received at the operation panel 102a or the operation panel 105b. More specifically, for example, the operation command signals include signals to move the cab 102 of the elevator 101 to a given floor, to stop the moved cab 102 at the corresponding floor, to open and close the doors 102c of the cab 102 and the doors 105a at the landing 105, at the floor stopped at, etc.

Upon receiving an operation command signal output from the main control board 121, the control board 110 generates based on the received operation command signal the various types of control signals described above and outputs the generated control signals to the components of the elevator 101. Through a terminal (not depicted) provided on the elevator 101 for maintenance and repair inspection, the main control board 121 inputs to the control board 110, various types of operation command signals output, through the relay board 201, from the monitoring control board 202, for example.

The terminal for maintenance and repair inspection is provided on the control board 110. Alternatively, the terminal for maintenance and repair inspection may be electrically connected to an input terminal of the control board 110 and independent of the control board 110. The terminal for maintenance and repair inspection, for example, is provided to connect a terminal apparatus (maintenance and repair/fault detection terminal) used for maintenance and repair inspection work during the maintenance and repair inspection work performed by a worker at the site where the elevator 101 is installed. The terminal for maintenance and repair inspection is not limited to the elevator 101 to which the terminal is provided for the purpose of remote monitoring and is generally provided on a wide variety of types of the elevator 101, irrespective of whether the elevator 101 is an existing elevator or a new elevator.

If the relay board 201 and the control board 110 are connected through the terminal for maintenance and repair inspection, the remote monitoring support apparatus 120 may have a connection terminal (not depicted) that enables connection and disconnection to the terminal for maintenance and repair inspection. In the remote monitoring support apparatus 120 configured as such, for example, the connection terminal and the terminal for maintenance and repair inspection can be connected by inserting and fitting the connection terminal into the terminal for maintenance and repair inspection.

Further, through the communications I/F 204, the remote monitoring support apparatus 120 receives various types of instruction signals transmitted from the management server computer 130. The management server computer 130, for example, outputs an instruction signal to the remote monitoring support apparatus 120, when at the maintenance and repair management company 150, an input operation, by an operator, to the management server computer 130 is received.

More specifically, for example, according to the input operation received at the management server computer 130, the management server computer 130 transmits an instruction signal (transmission instruction for notification information) instructing the transmission of notification information related to the results of a fault detection operation executed at the elevator 101. In this case, in addition to the transmission instruction for notification information, the management server computer 130 transmits to the elevator 101, an execution instruction for the fault detection operation.

The fault detection operation can be realized by outputting from the control board 110 to the components of the elevator 101, signals that cause operation of the components in a given sequence and outputting from the control board 110, signals indicating whether the components operated properly according to the signals output. The management server computer 130 may output the next fault detection instruction periodically, i.e., when a given period has elapsed since the output of a fault detection instruction (at a given interval such as every month).

More specifically, for example, according to the input operation received at the management server computer 130 or periodically, the management server computer 130 may transmit an instruction signal (transmission instruction for notification information) that instructs the transmission of notification information related to the running operation history stored at the control board 110. Notification information related to the running operation history, for example, can be realized by information related to the activation count, the travel distance of the cab 102, the travel time of the cab 102, operations counts of various relays operated for the lifting/lowering of the cab 102, the opening/closing of the doors 105a, 102c, etc.

If various types of instruction signals have been transmitted from the management server computer 130, the remote monitoring support apparatus 120 generates based on the received instruction signals, the operation command signal above and outputs the generated operation command signal to the control board 110. Further, when signals (control signal, etc.) output from the control board 110 have been obtained consequent to outputting to the control board 110, the operation command signal based on the various instruction signals transmitted from the management server computer 130, the remote monitoring support apparatus 120 generates response information based in the signal and outputs the generated response information to the management server computer 130.

The management server computer 130 generates report information based on the response information transmitted from the remote monitoring support apparatus 120 according to the various types of instruction signals transmitted to the remote monitoring support apparatus 120. For example, consequent to transmitting a fault detection instruction and a transmission instruction for notification information, the management server computer 130 generates report information based on the notification information received from the remote monitoring support apparatus 120. In this case, the management server computer 130, for example, generates report information that includes information related to the travel distance of the elevator 101 and/or activation counts.

Further, the management server computer 130 has a function of issuing a report (not depicted) based on the generated report information. The report, for example, can be issued each time the fault detection operation is performed for the elevator 101, i.e., each time response information is received in response to an instruction signal (fault detection instruction) that instructs the execution of the fault detection operation and is transmitted to the remote monitoring support apparatus 120. More specifically, for example, based on the generated report information, the management server computer 130 generates printing information for printing the report information on a recording medium such as paper and outputs the generated printing information to the operations terminal apparatus 131 connected to the management server computer 130. The operations terminal apparatus 131, upon receiving the printing information, can publish the report by controlling the driving of a printer connected to the operations terminal apparatus 131.

(Functional Configuration of Remote Monitoring System 100)

A functional configuration of the remote monitoring system 100 of the embodiment according to the present invention will be described. FIG. 3 is a block diagram depicting a functional configuration of the remote monitoring support apparatus 120 configuring the remote monitoring system 100 of the embodiment according to the present invention.

(Functional Configuration of Remote Monitoring Support Apparatus 120)

In FIG. 3, functions of the remote monitoring support apparatus 120 of the elevator 101 of the embodiment according to the present invention are realized by a receiving unit 301, a storage unit 302, a generating unit 303, an output unit 304, an obtaining unit 305, and a transmitting unit 306.

Functions of the receiving unit 301, the storage unit 302, the generating unit 303, the output unit 304, the obtaining unit 305, and the transmitting unit 306 of the remote monitoring support apparatus 120 of the elevator 101 of the embodiment according to the present invention can be realized by the components of the remote monitoring support apparatus 120.

The receiving unit 301 receives various types of instruction signals transmitted from the management server computer 130. The receiving unit 301, for example, receives a transmission instruction for notification information transmitted from the management server computer 130. In a case where a fault detection instruction is received by the receiving unit 301, the storage unit 302 stores information related to the date and time when the fault detection instruction was received. Thus, without communication with the management server computer 130, the operation of the elevator 101 can be periodically monitored.

In a case where a transmission instruction is received by the receiving unit 301, the generating unit 303 generates an operation command signal that causes execution of the fault detection operation at the elevator 101. The generating unit 303 generates an operation command signal that is converted by the relay board 201, into a format that can be analyzed by the control board 110. In a case where a transmission instruction is received by the receiving unit 301, the generating unit 303 generates an operation command signal that includes an instruction to output a signal that causes operation of the components of the elevator 101 in a given sequence.

More specifically, for example, the generating unit 303 generates an operation command signal that causes the driving of the motor that lifts and lowers the cab 102 of the elevator 101, the driving of a brake that stops the cab 102 when the cab 102 is moving, the driving of the motor that opens and closes the doors 105a, 102c at the landing 105 and on the cab 102, etc. to be controlled by the control board 110.

In a case where a transmission instruction is received by the receiving unit 301, the output unit 304 outputs to the control board 110, an operation command signal that causes the fault detection operation above to be executed with respect to the elevator 101. In the present embodiment, the output unit 304 outputs to the control board 110, the operation command signal generated by the generating unit 303.

For example, during the inspection work performed by a worker at the site, the output unit 304 outputs the operation command signal through a terminal that connects a portable terminal apparatus (maintenance and repair/fault detection terminal, not depicted). The operation command signal output by the output unit 304 is converted by the relay board 201 into a format that can be analyzed by the control board 110 and therefore, similar to a case where a signal for performing the fault detection operation is directly input from the maintenance and repair/fault detection terminal, the control board 110 can be caused to perform the fault detection operation.

The output unit 304, for example, may output the operation command signal to the control board 110, through wiring connecting the components of the elevator 101 and the control board 110. In this case, more specifically, for example, the output unit 304 can output the operation command signal to the control board 110, through wiring by which the components of the elevator 101 output signals to the control board 110.

Without limitation to cases where a transmission instruction is received by the receiving unit 301, the output unit 304 may output an operation command signal to cause execution of the next fault detection operation, after a given period has elapsed since the output of the previous operation command signal to the control board 110. More specifically, for example, based on information related to the dates and times stored in the storage unit 302, the output unit 304 may output an operation command signal to cause execution of the next fault detection operation, after one month has elapsed since the output of the previous execution instruction for the fault detection operation.

Thus, without communication with the management server computer 130, an operation command signal to cause execution of the fault detection operation can be output periodically to the control board 110. As a result, the load for communication is reduced and the fault detection operation can be periodically performed with respect to the elevator 101.

The obtaining unit 305 obtains signals output from the control board 110 to destinations external to the control board 110. The obtaining unit 305, for example, obtains control signals output to the components of the elevator 101 from the control board 110 in response to an operation command signal that causes execution of the fault detection operation and is output by the output unit 304.

The obtaining unit 305, for example, obtains the control signal that is output from the control board 110 when a given input operation is received at the operation panel 105b at the landing 105 of each floor and at the operation panel 102a of the cab 102 of the elevator 101. Further, for example, the obtaining unit 305 obtains the floor signals output from the control board 110 to the operation panel 105b at the landing 105 of each floor and to the operation panel 102a of the cab 102 of the elevator 101.

The obtaining unit 305, for example, obtains an alarm signal output from the control board 110 when consequent to the detection of an earthquake of a given intensity or greater, the operation mode of the elevator 101 changes from an operation mode during normal times to an operation mode in the event of an earthquake. Further, for example, when failure occurs at the elevator 101 such as when the floor signal indicating the location of the cab 102 does not change despite a control signal being output to the motor that lifts and lowers the cab 102 of the elevator 101, the obtaining unit 305 outputs an alarm signal for giving to an external destination, notification of the failure.

The obtaining unit 305, for example, obtains a control signal through a terminal that can connect the maintenance and repair/fault detection terminal. Further, for example, the obtaining unit 305 may obtain a control signal at a connection position of the control board 110 and wiring (or a branch connector) that is connected to the components that are output destinations of the control signal.

The obtaining unit 305, for example, may obtain a control signal through the relay that is provided on the control board 110 and whose output changes according to the state of the components of the elevator 101. Further, for example, the obtaining unit 305 may obtain a control signal through an LED that turns off and on interlocked with the operation of the components of the elevator 101. The obtaining unit 305 may further obtain a control signal through the feet that fix the relay or the LED to the control board 110.

The generating unit 303 described above generates based on the signal obtained by the obtaining unit 305, notification information that includes information related to the state of the elevator 101. The generating unit 303, for example, generates based on a control signal output from the control board 110, notification information indicating that the elevator 101 is operating normally. Further, for example, the generating unit 303 generates based on a floor signal output from the control board 110, notification information indicating the floor at which the cab 102 of the elevator 101 is currently located. The generating unit 303, for example, generates based on an alarm signal output from the control board 110, notification information indicating that the current operation mode of the elevator 101 has changed or that a failure has occurred at the elevator 101.

The generating unit 303 generates notification information each time the obtaining unit 305 obtains a signal. Alternatively, for example, the generating unit 303 may generate notification information when the obtaining unit 305 obtains a specific signal. More specifically, for example, the generating unit 303 may generate notification information when the obtaining unit 305 obtains an alarm signal indicating that the current operation mode of the elevator 101 has changed.

The transmitting unit 306 transmits the notification information generated by the generating unit 303 to the management server computer 130. Each time the generating unit 303 generates notification information, the transmitting unit 306 transmits the notification information to the management server computer 130. Alternatively, for example, configuration may be such that when the generating unit 303 generates specific notification information, the transmitting unit 306 transmits the notification information to the management server computer 130. More specifically, for example, when notification information based on an alarm signal indicating that the current operation mode of the elevator 101 has changed is generated by the generating unit 303, the notification information may be transmitted by the transmitting unit 306 to the management server computer 130.

(Process Procedure of Remote Monitoring Support Apparatus 120)

A process procedure of the remote monitoring support apparatus 120 will be described. FIGS. 4 and 5 are flowcharts depicting a process procedure of the remote monitoring support apparatus 120 of the embodiment according to the present invention. In the flowchart depicted in FIG. 4, the remote monitoring support apparatus 120 stands by until a control signal output from the control board 110 is obtained (step S401: NO).

At step S401, when a control signal output from the control board 110 has been received (step S401: YES), the remote monitoring support apparatus 120 generates notification information based on the obtained control signal (step S402). At step S402, for example, the remote monitoring support apparatus 120 generates notification information that includes information related to the traveling direction of the cab 102, the floor that is the destination of the cab 102, whether the cab 102 is stopped at the floor that is the destination of the cab 102, whether the motor that opens and closes the doors 105a, 102c is operated, the floor at which the cab 102 is currently located, whether safety apparatuses of various types are operated, etc.

Subsequently, the remote monitoring support apparatus 120 transmits to the management server computer 130, the notification information generated at step S402 (step S403), and ends a series of operations. At step S403, the notification information generated at step S402 is transmitted to the management server computer 130 from the communications I/F 204, through the network 160 such as the Internet.

In the flowchart depicted in FIG. 5, the remote monitoring support apparatus 120 determines whether a transmission instruction for notification information, transmitted from the management server computer 130 has been received (step S501). At step S501, if a transmission instruction for notification information transmitted from the management server computer 130 has been received (step S501: YES), based on the received transmission instruction, the remote monitoring support apparatus 120 generates an operation command signal that causes execution of the fault detection operation at the elevator 101 (step S502).

The remote monitoring support apparatus 120 outputs to the control board 110, the operation command signal generated at step S502 (step S503), and ends a series of operations. At step S503, for example, the operation command signal generated at step S502 is output through the connection terminal provided on the control board 110 to connect the maintenance and repair/fault detection terminal.

Meanwhile, at step S501, if no transmission instruction output from the management server computer 130 has been received (step S501: NO), the remote monitoring support apparatus 120 determines whether a given period has elapsed since the previous operation command signal for causing execution of the fault detection operation at the elevator was transmitted to the control board 110 (step S504). At step S504, if the given period has not elapsed since the transmission of the previous operation command signal for causing execution of the fault detection operation at the elevator 101 (step S504: NO), the remote monitoring support apparatus 120 returns to step S501 and determines whether a transmission instruction for notification information, transmitted from the management server computer 130 has been received.

At step S504, if the given period has elapsed since the transmission of the previous operation command signal for causing execution of the fault detection operation at the elevator 101 (step S504: YES), the remote monitoring support apparatus 120 transitions to step S502 and generates an operation command signal for causing execution of the fault detection operation at the elevator 101. In this case, at step S502, for example, the remote monitoring support apparatus 120 generates based on information newly stored at the remote monitoring support apparatus 120, an operation command signal for causing execution of the fault detection operation at the elevator 101.

As described, the remote monitoring support apparatus 120 of the present embodiment obtains a signal output from the control board 110 to a destination external to the control board 110; generates based on the obtained signal, notification information that includes information related to the state of the elevator 101; and transmits the generated notification information to the management server computer 130.

According to the remote monitoring support apparatus 120 of the present embodiment, by obtaining notification information that is based on a signal output from the control board 110 to a destination external to the control board 110 and transmitting the notification information to the management server computer 130, without limitation to the elevator 101 provided with a communications function enabling the control board 110 to communicate with external apparatuses installed at a remote location, even for the elevator 101 that is not provided with a communications function, remote monitoring of the respective elevators 101 can be performed.

As a result, irrespective of whether the elevator 101 itself has a communications function, remote monitoring of the elevator 101 can be performed and therefore, improved reliability of the elevator 101 is facilitated and the safety of users is ensured, enabling the users to use the elevator 101 without worry.

The remote monitoring support apparatus 120 of the present embodiment is characterized in that a control signal is obtained that controls the components and is output from the control board 110 to the components of the elevator 101.

According to the remote monitoring support apparatus 120 of the present embodiment, by transmitting to the management server computer 130, notification information that is based on a control signal output from the control board 110 to the components of the elevator 101, remote monitoring of the elevator 101 can be performed, without separately providing a dedicated terminal for outputting information related to the state of the elevator 101 to the control board or installing on the control board, a program that generates information related to the state of the elevator 101.

Thus, remote monitoring of the elevator 101 can be performed irrespective of the model of the elevator 101 and therefore, improved reliability of the elevator 101 is facilitated and the safety of users is ensured, enabling the users to use the elevator 101 without worry.

The remote monitoring support apparatus 120 of the present embodiment is characterized in that an alarm signal is obtained that is output from the control board 110 to a destination external to the control board 110 to notify the external destination of a failure that occurred at the elevator 101.

According to the remote monitoring support apparatus 120 of the present embodiment, by transmitting to the management server computer 130, notification information that is based on an alarm signal that is output from the control board 110 to a destination external to the control board 110, remote monitoring of the elevator 101 can be performed using the existing functions of the elevator 101. As a result, remote monitoring of the elevator 101 can be performed irrespective of the model of the elevator 101 and therefore, improved reliability of the elevator 101 is facilitated and the safety of users is ensured, enabling the users to use the elevator 101 without worry.

When the operation mode of the elevator 101 has changed from the normal operation mode to an operation mode other than the normal operation mode consequent to an abnormality that occurred at the elevator 101 or the detection of an earthquake of a given intensity or greater at the installation site of the elevator 101, the remote monitoring support apparatus 120 of the present embodiment may obtain a signal that is output from the control board 110 to a destination external to the control board 110, to give notification that operation mode changed and to give notification of the operation mode.

As result, even during a state of emergency such as an earthquake of a given intensity or greater, if the elevator 101 is operating properly, remote monitoring of the elevator 101 can be performed using the existing functions of the elevator 101. Consequently, remote monitoring of the elevator 101 can be performed irrespective of the model of the elevator 101 and therefore, improved reliability of the elevator 101 is facilitated and the safety of users is ensured, enabling the users to use the elevator 101 without worry.

The remote monitoring support apparatus 120 of the present embodiment is characterized in that when a transmission instruction for notification information, transmitted from the management server computer 130 is received, the remote monitoring support apparatus 120 outputs to the control board 110, an execution instruction for the fault detection operation, and obtains controls signals output to the components of the elevator 101 from the control board 110 in response to the output execution instruction for the fault detection operation.

According to the remote monitoring support apparatus 120 of the present embodiment, by transmitting to the management server computer 130, notification information that is based on a control signal output from the control board 110 to the components of the elevator 101 when the fault detection operation is executed by the control board 110 in response to an instruction from the management server computer 130, remote monitoring of the elevator 101 can be performed. Consequently, remote monitoring of the elevator 101 can be performed at an arbitrary timing set on the management server computer 130 side and therefore, improved reliability of the elevator 101 is facilitated and the safety of users is ensured, enabling the users to use the elevator 101 without worry.

The remote monitoring support apparatus 120 of the present embodiment is characterized in that an execution instruction for the fault detection operation is output to the control board 110 through a terminal (maintenance port) that can connect a terminal apparatus (maintenance and repair inspection terminal) for maintenance.

According to the remote monitoring support apparatus 120 of the present embodiment, by outputting an execution instruction for the fault detection operation through a terminal that can connect an existing fault detection terminal apparatus (maintenance and repair inspection terminal) used in the fault detection of the elevator 101 at the installation site of the elevator 101, without newly providing a mechanism for inputting the execution instruction for the fault detection operation to the control board 110, the control board 110 can be easily caused to execute the fault detection operation. Consequently, improved reliability of the elevator 101 is facilitated and the safety of users is ensured, enabling the users to use the elevator 101 without worry.

The remote monitoring support apparatus 120 of the present embodiment can assess the state of the elevator 101 at given periods, irrespective of whether a fault detection instruction is transmitted by the management server computer 130. As a result, the processing load of the management server computer 130 involved in the remote monitoring of the elevator 101 can be reduced and the reliability of the elevator 101 can be improved.

INDUSTRIAL APPLICABILITY

As described, the remote monitoring support apparatus of the present invention is useful for a remote monitoring support apparatus that performs remote elevator-monitoring and is particularly, suitable for a remote monitoring support apparatus that performs remote monitoring of an elevator after installation.

EXPLANATIONS OF LETTERS OR NUMERALS 110 control board (control apparatus)
120 remote monitoring support apparatus
130 management server computer
140 telephone
301 receiving unit
302 storage unit
303 generating unit
304 output unit
305 obtaining unit
306 transmitting unit

The invention claimed is:

1. A remote monitoring support apparatus that is connected to a control board and performs communication between a management server computer and the control board that controls operation of an elevator, wherein the remote monitoring support apparatus:
  receives a fault detection instruction that instructs transmission of information related to a state of the elevator and that is transmitted from the management server computer;
  outputs to the control board, an execution instruction for a fault detection operation according to the received fault detection instruction;
  obtains at least any one among a signal output from the control board to an external destination in response to the output execution instruction for the fault detection operation, and a signal that is for alarm activation and output from the control board to notify the external destination of an abnormality that has occurred at the elevator;
  generates notification information that is based on the obtained signal; and
  transmits the generated notification information to the management server computer.

2. A remote monitoring support apparatus that is connected to a control board and performs communication between a management server computer and the control board that controls operation of an elevator, wherein the remote monitoring support apparatus:
  outputs at a given timing to the control board, an execution instruction for a fault detection operation related to a state of the elevator;
  obtains at least any one among a signal output from the control board to an external destination in response to the output execution instruction for the fault detection operation, and a signal that is for alarm activation and output from the control board to notify the external destination of an abnormality that has occurred at the elevator;
  generates notification information that is based on the obtained signal; and
  transmits the generated notification information to the management server computer.

3. The remote monitoring support apparatus according to claim 1, wherein
  the remote monitoring support apparatus transmits to the control board, the execution instruction for the fault detection operation, through wiring connecting components of the elevator and the control board.

4. The remote monitoring support apparatus according to claim 2, wherein
  the remote monitoring support apparatus transmits to the control board, the execution instruction for the fault detection operation, through wiring connecting components of the elevator and the control board.

5. The remote monitoring support apparatus according to claim 1, wherein
  the remote monitoring support apparatus, when a given period has elapsed since outputting the execution instruction for the fault detection operation, outputs a subsequent execution instruction for the fault detection operation.

6. The remote monitoring support apparatus according to claim 2, wherein
  the remote monitoring support apparatus, when a given period has elapsed since outputting the execution instruction for the fault detection operation, outputs a subsequent execution instruction for the fault detection operation.

7. The remote monitoring support apparatus according to claim 3, wherein the remote monitoring support apparatus, when a given period has elapsed since outputting the execution instruction for the fault detection operation, outputs a subsequent execution instruction for the fault detection operation.

8. The remote monitoring support apparatus according to claim 4, wherein
the remote monitoring support apparatus, when a given period has elapsed since outputting the execution instruction for the fault detection operation, outputs a subsequent execution instruction for the fault detection operation.

\* \* \* \* \*